United States Patent
Kaefer et al.

(10) Patent No.: US 7,770,074 B2
(45) Date of Patent: Aug. 3, 2010

(54) METHOD AND DEVICE FOR THE FAULT-TOLERANCE MANAGEMENT OF A SOFTWARE COMPONENT

(75) Inventors: Gerald Kaefer, Munich (DE); Christoph Koonig, Ottobrunn (DE); Reiner Schmid, Munich (DE)

(73) Assignee: Fujitsu Siemens Computers GmbH, Munich (DE)

( * ) Notice: Subject to any disclaimer, the term of this patent is extended or adjusted under 35 U.S.C. 154(b) by 1 day.

(21) Appl. No.: 12/123,887

(22) Filed: May 20, 2008

(65) Prior Publication Data

US 2008/0263405 A1 Oct. 23, 2008

Related U.S. Application Data

(63) Continuation of application No. PCT/EP2007/004588, filed on May 23, 2007.

(30) Foreign Application Priority Data

May 23, 2006 (DE) .................. 10 2006 024 233

(51) Int. Cl.
G06F 11/00 (2006.01)
(52) U.S. Cl. .................. 714/48; 714/38; 717/124
(58) Field of Classification Search .................. 714/38, 714/48; 717/124
See application file for complete search history.

(56) References Cited

U.S. PATENT DOCUMENTS

| 4,769,761 | A | | 9/1988 | Downes et al. |
| 5,208,814 | A | | 5/1993 | Ulrich et al. |
| 5,634,098 | A | * | 5/1997 | Janniro et al. .................. 714/38 |
| 5,751,964 | A | * | 5/1998 | Ordanic et al. ............... 709/224 |
| 6,560,772 | B1 | * | 5/2003 | Slinger ........................ 717/124 |
| 6,662,312 | B1 | * | 12/2003 | Keller et al. .................... 714/38 |
| 6,718,482 | B2 | * | 4/2004 | Sato et al. ........................ 714/4 |
| 6,934,892 | B2 | * | 8/2005 | Misaka et al. .................. 714/48 |
| 7,287,190 | B2 | * | 10/2007 | Rosenman et al. ............. 714/32 |
| 7,293,202 | B2 | * | 11/2007 | Kamani et al. ................. 714/38 |
| 7,437,713 | B2 | * | 10/2008 | Beardsley et al. ............ 717/124 |
| 2003/0023406 | A1 | | 1/2003 | Kataoka |
| 2004/0015863 | A1 | * | 1/2004 | McBrearty et al. ........... 717/124 |
| 2008/0184079 | A1 | * | 7/2008 | Merriman et al. .............. 714/48 |

OTHER PUBLICATIONS

Holly, R., "I, Testbot," Dr. Dobb's Journal, May 2006, pp. 42-44, http://www.ddj.com.

* cited by examiner

Primary Examiner—Philip Guyton
(74) Attorney, Agent, or Firm—Slater & Matsil, L.L.P.

(57) ABSTRACT

A fault-tolerance management of a software component is disclosed. A number of instances of the software component are executed in at least somewhat different execution environments. A local error susceptibility register and a global error susceptibility register are assigned to each software component. An error of first instance of the software component is detected. The local error susceptibility register of the first instance is updated based on the detected error and the content of the local error susceptibility register of the first instance. The global error susceptibility register of each instance is also updated based on the detected error and the content of the global error susceptibility register of each instance. The difference between the respective local error susceptibility register and the respective global error susceptibility register is determined, and the fault tolerance value of the software component in the respective execution environment is determined based on the determined difference.

16 Claims, 4 Drawing Sheets

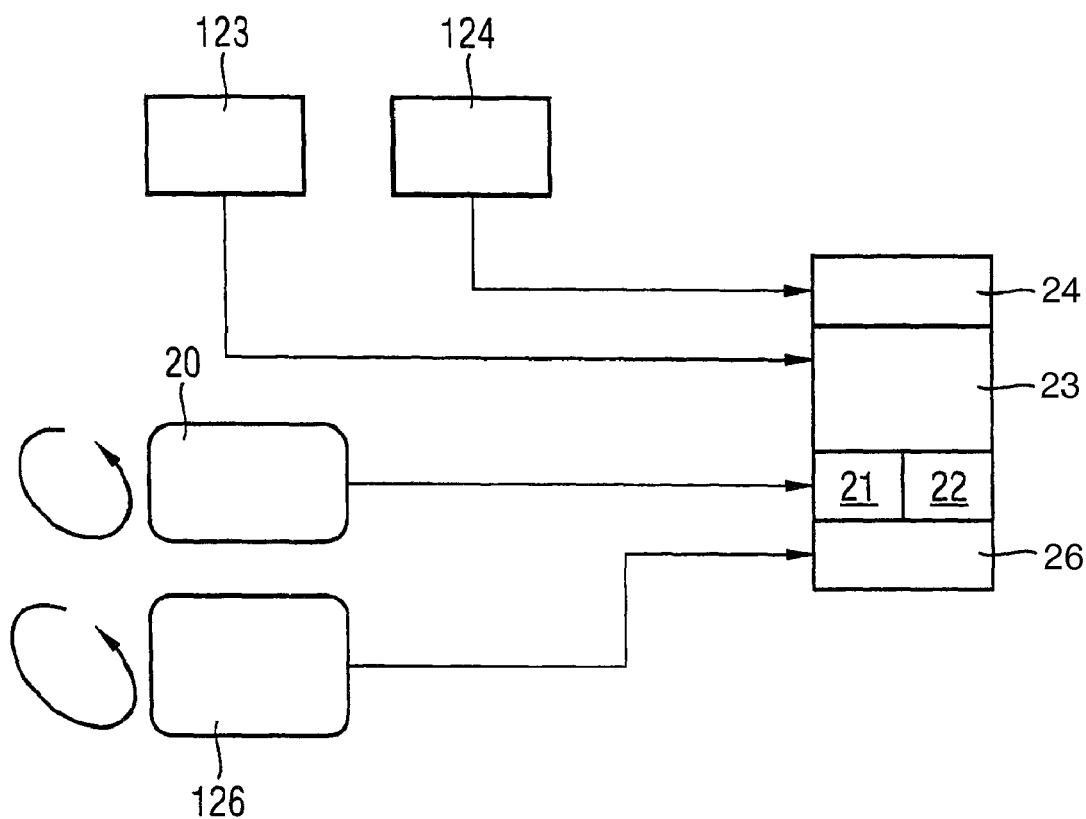

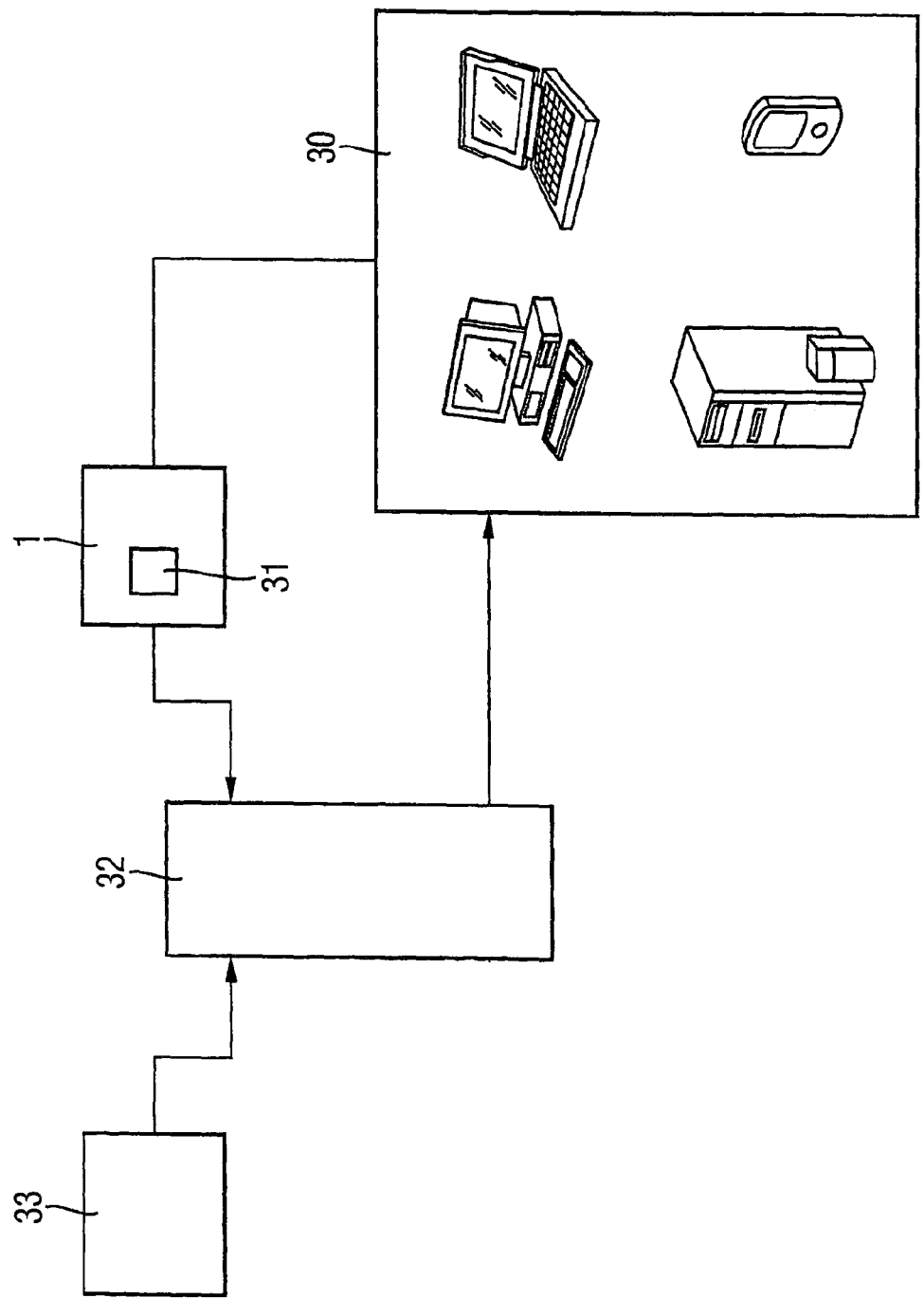

METHOD AND DEVICE FOR THE FAULT-TOLERANCE MANAGEMENT OF A SOFTWARE COMPONENT

This application is a continuation of co-pending International Application No. PCT/EP2007/004588, filed May 23, 2007, which designated the United States and was not published in English, and which is based on German Application No. 10 2006 024 233.5 filed May 23, 2006, both of which applications are incorporated herein by reference.

TECHNICAL FIELD

The present invention pertains to a method for the fault-tolerance management of a software component and to a device for carrying out the inventive method.

BACKGROUND

Modern computer systems are composed of a plurality of different hardware components and software components that interact in a complex manner. Individual components perform their tasks by utilizing services that are offered by other hardware components or software components. Prominent examples of this are operating systems that access drivers for the hardware components or web-based services that run jointly on a local computer and a remote computer.

It is required that the integration of applications of this type does not depend on the hardware components and software components used. The administration of such systems therefore is very demanding because small changes can lead to undesirable interactions between individual components. It is usually not possible to estimate the risk of errors, as well as their probability and extent beforehand, when individual components are changed, for example, in the form of an update. Administrators typically are only able to detect the occurring errors and the corresponding sources of errors after an extended trial-and-error phase.

SUMMARY

In a first embodiment, the tolerance of a software component that is executed in a certain execution environment to occurring changes and occurring errors is determined and described with special fault tolerance values. The fault tolerance values determined in this way provide an administrator with valuable information on the extent of errors caused by changes to the software component and/or the execution environment. This enables the administrator, if so required, to isolate software components that are particularly susceptible to errors and to manage these software components separately.

One embodiment provides for fault-tolerance management of a software component. In this embodiment, a number of instances of the software component are executed in at least somewhat different execution environments. A local error susceptibility register and a global error susceptibility register are assigned to each software component. An error of first instance of the software component is detected. The local error susceptibility register of the first instance is updated based on the detected error and the content of the local error susceptibility register of the first instance. The global error susceptibility register of each instance is also updated based on the detected error and the content of the global error susceptibility register of each instance. The difference between the respective local error susceptibility register and the respective global error susceptibility register is determined, and the fault tolerance value of the software component in the respective execution environment is determined based on the determined difference.

An instance refers to a software component loaded into the main memory. The main memory content of a software component instance consists of memory contents that are identical for all instances and contain a program code, and of specific areas for all instances that contain the runtime data. A software component is considered to be identical to another software component if it is based on the same source code (program code). Instances of identical software components are considered instances of the same software component in the context of this description.

According to one aspect of the present invention, two registers are assigned to each instance of a software component. The first register or local register stores the occurring errors of this instance for the respective execution environment. An average value of the types of the errors of all instances is stored for a software component in the second register or global register. Consequently, the behavior of the software component is recorded in the different execution environments. Each instance of the software component now determines a deviation between its behavior and the average behavior of the other instances of the software component. A significant deviation between the local error susceptibility register and the global error susceptibility register indicates that the software component does not run stably in the given execution environment. In this case, one should refrain from making additional changes to the execution environment or the software component, if possible, or the administrator must carefully monitor the software component in this execution environment after the change is made.

An inventive device for the fault-tolerance management of a software component includes a number of data processing devices for executing a plurality of instances of the software components in at least somewhat different execution environments. Each data processing device features a first storage unit for storing a local error susceptibility register and a second storage unit for storing a global error susceptibility register. A detection device detects an error of first instance of the plurality of instances and a communication interface distributes the detected error. Updating devices update the local error susceptibility register and the global error susceptibility register based on the detected error and a fault-tolerance averaging device determines a fault-tolerance value of the software component in the respective execution environment based on a difference between the respective local error susceptibility register and the respective global error susceptibility register.

An execution environment describes the sum of all devices that interact directly or indirectly with a software component. This typically includes all interfaces with hardware devices used, drivers for these interfaces, the operating system, applications in which the software component is embedded, etc.

Refinements and embodiment examples are disclosed in the specification and claims.

According to one implementation, the detected error is transmitted to a central detection station, and the central detection station updates the global error susceptibility register of each instance of the software components. For this purpose, the detection station has access to the global error susceptibility register. The detection station itself may contain and update a global error susceptibility register based on the detected errors. This updated global error susceptibility register of the central detection station is then advantageously distributed to the instances of the software components.

In one implementation, the central detection station buffers the detected error being transmitted in a buffer, and each instance regularly updates its global error susceptibility register with consideration of the intermediately stored error.

In one implementation, the local error susceptibility register and the global error susceptibility register are updated by utilizing a statistical method. The statistical method may take into account the execution time of one of the instances for the respective local error susceptibility register and take into account the sum of the execution times of all instances for the global error susceptibility register.

In one implementation, the instances are executed in different execution environments in which the instances interact with different software components and/or different hardware.

BRIEF DESCRIPTION OF THE DRAWINGS

The present invention is described below with reference to preferred embodiment examples that are illustrated in the enclosed figures, which figures show:

FIG. 3 is a block diagram of a second embodiment, and

FIG. 4 is a block diagram of a fault-tolerance management system.

DETAILED DESCRIPTION

Figure 1:
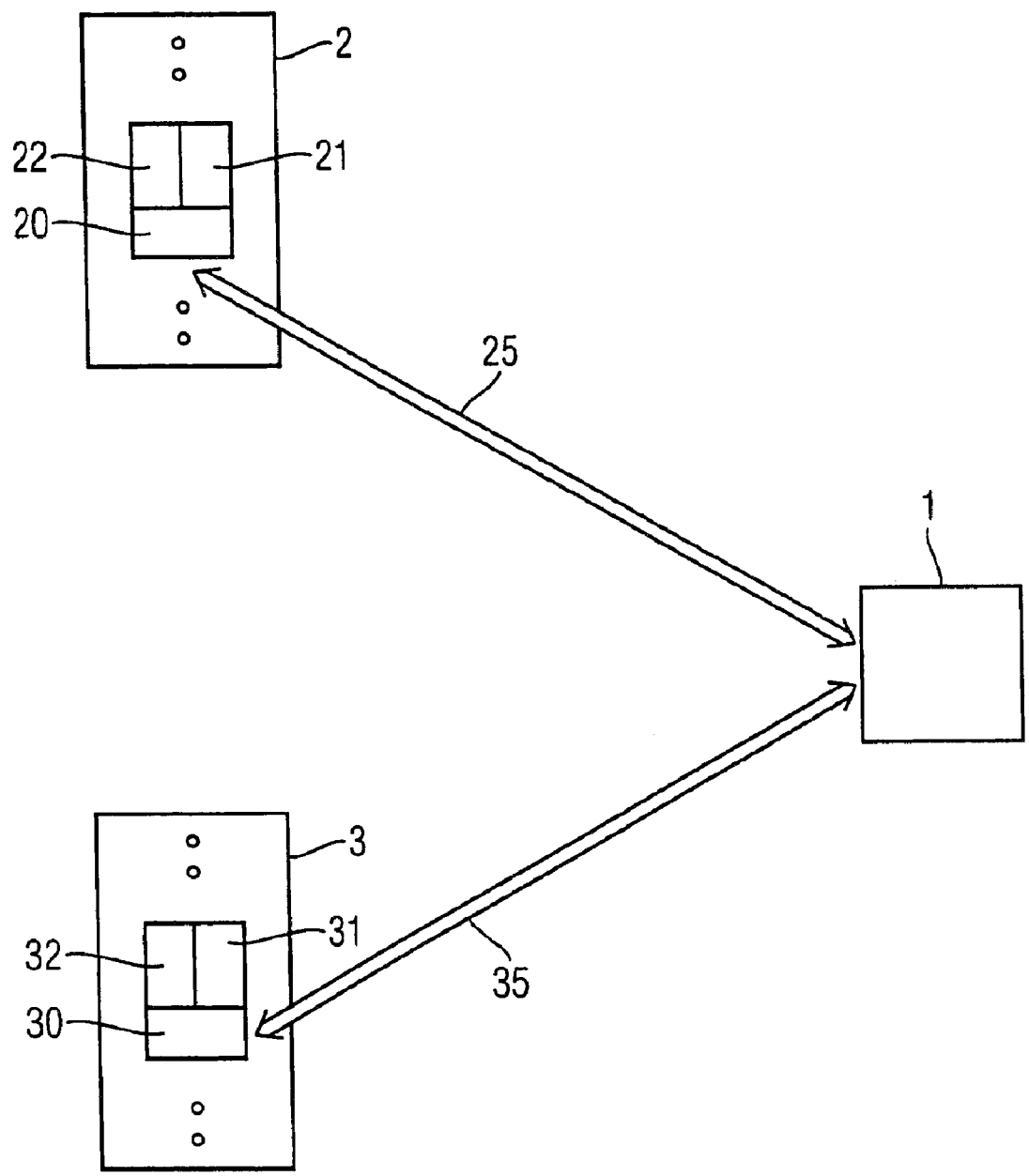
FIG. 1 is a block diagram of one embodiment.

FIG. 1 shows two execution environments 2, 3 that are representative of a plurality of execution environments. One process or software component or a plurality of processes or software components is/are executed in each of the execution environments 2, 3. An execution environment 2, 3 is characterized by the interaction of the software components executed therein with other software components and the hardware used.

The execution environment may form a local unit, for example, an office computer or be a distributed system as is made available, for example, for Internet-based services.

At least one of the software components is executed in several execution environments 2, 3. These identical executed software components are referred to as instances 20, 30 of the software component.

It was already mentioned in the background that one significant problem for an administrator who manages such an execution environment 2, 3 is that it cannot be determined beforehand if a change to the execution environment leads to an error of the corresponding instance of the software component.

A so-called fault-tolerance parameter is introduced for this purpose. With respect to the software component, the error susceptibility of this software component is estimated during its development. Such an estimate can be based on the length of the code, the number of software component interfaces used, or other features. A fault-tolerance parameter can be provided by the manufacturer. Analogously, the software components can be executed in different standardized execution environments during admission tests, and their errors and faulty behavior can be detected. A software component is only executed in an execution environment if a minimum execution quality of the software component can be expected based on the combination of the fault tolerance values of an execution environment and the software component.

Figure 2:
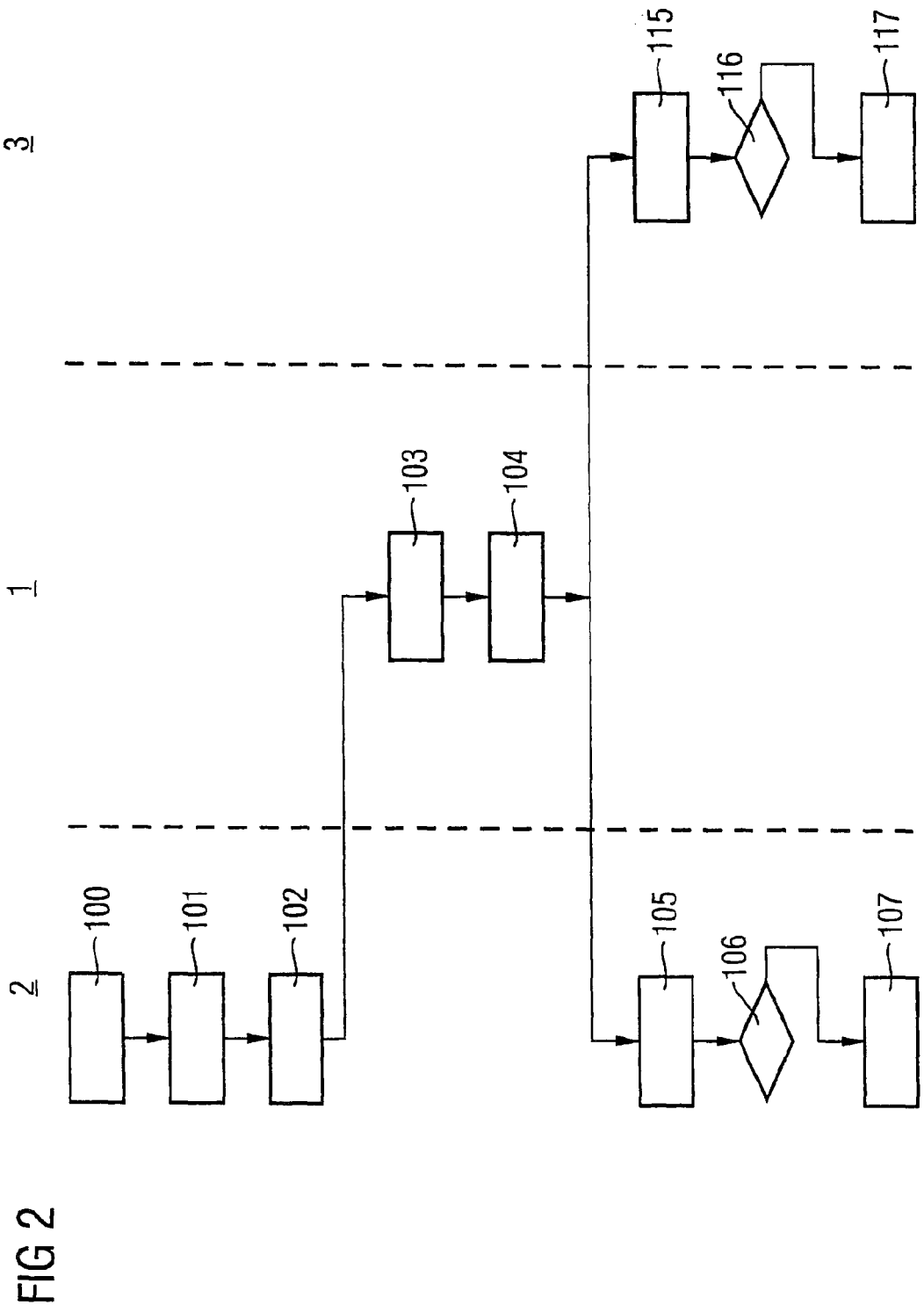
FIG. 2 is a flow chart of a method for the embodiment according to FIG. 1.

In the present embodiment, the errors are also updated while the instances 20, 30 are executed in the execution environment 2, 3 in order to determine a dynamic fault-tolerance value (step 100 of FIG. 2). Each of the instances 20, 30 detects errors or similar types of events, for example, a buffer overrun, an interrupted connection, a packet loss or an application restart. The software component 20 subsequently updates a local error susceptibility register 21 (step 101).

The software component and therefore also the instance 20 features an interface or a channel 25 in order to communicate with a central detection device 1. The last error detected is transmitted to this central detection device (step 102). Based on the transmitted error messages, the central detection device 1 determines a global frequency of the individual errors, in how many instances 20, 30 of the software component such an error has already occurred, etc. (step 103). The central detection device transmits this global value to all instances 20, 30 of the software component via the channels 25, 35 (step 104).

In addition to the local error susceptibility register 21, 31, each instance 20, 30 is also assigned a global error susceptibility register 22, 32. The instances 20, 30 store the global value received from the central detection device 1 in this global error susceptibility register (step 105, 115).

In a subsequent step, the instances 20, 30 compare the contents of their local and their global error susceptibility registers (step 106, 116). If the local and the global error susceptibility registers differ significantly, the respective instance of the software component advantageously outputs a warning signal since the execution of the software component in the given execution environment is not as stable compared with the other software components. Consequently, changes to this execution environment, for example, by means of updates should only be made very carefully.

A new fault-tolerance value is determined for the software component in the execution environment (step 107, 117). This new fault-tolerance value is determined based on the difference between the respective local error susceptibility register 21, 31 and the respective global error susceptibility register 22, 32. The higher the error susceptibility of the instance in the execution environment in comparison with the error susceptibility of the other instances of this software component in the other execution environments, the lower the fault tolerance. Thus, the software component is rather unstable in this execution environment and should not be subjected to further changes to the execution environment.

FIG. 3 shows an expanded version of the above-described first embodiment example. In this case, other registers are provided in addition to the above-described global and local registers for recording the behavior of the software component in an execution environment. An administrator can store additional parameters 126 with respect to the occurrence of errors in a register 26. This includes, for example, the availability estimates, the robustness estimates, the risk estimates, the specifically experienced performance and the specifically experienced errors. These parameters 126 can be regularly refreshed and transmitted to the register 26. Analogously, the software components 20 update the local error susceptibility register 21 within regular intervals or when an error occurs. The global error susceptibility register 22 is then updated accordingly by the central detection device 1.

In addition, a register 23 for storing specific manufacturer parameters 123 and/or a register 24 for storing parameters from admission tests 124 could also be provided. Before an update or before a change to the execution environment, all parameters in the registers 21 to 24 are evaluated in order to determine the risk of a severe error of the software component if the execution environment is changed.

FIG. 4 shows a fault-tolerance management system that uses the above-described parameters. The central detection device 1 detects the errors occurring in the execution environments, for example, computer systems 30. Based on these parameters, a central evaluation device 31 assesses if the execution environment can be updated without causing serious errors. If this is the case, the central evaluation device 31 sends a release signal to the updating device 32. Consequently, the updating device can automatically update the execution environments or software components with updates or patches. The updates or patches can be made available by a database 33.

According to an additional refinement, the central evaluation device 31 determines a threshold value based on the individual fault-tolerance values of the instances. This threshold value is sent to the updating device 32. Furthermore, an estimated value is sent to the updating device by the database 33 for updates. This estimated value is a measure of the changes to be made to the execution environments by means of an update or a patch. This value can be determined by means of admission tests or provided by the distributor of the updates are patches. If this value remains below the threshold value, the installation of the update or the patch, i.e., the change to the execution environment, appears justifiable and the changes are carried out. The parameters provided by the system administrator are also taken into account.

Although embodiments of the present invention are described with reference to the fault-tolerance management of an individual software component, it is not limited to this specific instance. The fault-tolerance management is expanded to a plurality of software components by providing a corresponding number of error susceptibility registers and other required units.

What is claimed is:

1. A method for fault-tolerance management of a software component, the method comprising:
   executing a plurality of instances of the software component in different execution environments, wherein a local error susceptibility register and a global error susceptibility register are assigned to each instance;
   detecting an error of a first instance of the software component;
   updating the local error susceptibility register of the first instance based on the detected error and a content of the local error susceptibility register of the first instance;
   transmitting the detected error to a central detection station;
   temporarily storing the detected error in a buffer, the temporarily storing being initiated by the central detection station: and
   updating the global error susceptibility register of each instance based on the detected error and the content of the global error susceptibility register of each instance by regularly updating, by each instance, a respective global error susceptibility register with consideration of the temporarily stored error;
   determining a difference between the respective local error susceptibility register and the respective global error susceptibility register, and
   determining a fault-tolerance value indicative of the stability of executing the software component in the respective execution environment based on the determined difference.

2. The method according to claim 1, wherein the local error susceptibility register and the global error susceptibility register are updated by utilizing a statistical method.

3. The method according to claim 2, wherein the statistical method takes into account an execution time of one of the instances for the respective local error susceptibility register, as well as the sum of the execution times of all instances for the global error susceptibility register.

4. The method according to claim 1, wherein the instances are executed in different environments in which the instances interact with different software components.

5. The method according to claim 4, wherein the instances are executed in different environments in which the instances also interact with different hardware.

6. The method according to claim 1, wherein the instances are executed in different environments in which the instances interact with different hardware.

7. A method for fault-tolerance management of a software component, the method comprising:
   executing a plurality of instances of the software component in different execution environments, wherein a local error susceptibility register and a global error susceptibility register are assigned to each instance;
   detecting any errors for each of the instances and, if errors are detected, updating the local error susceptibility register of each instance;
   communicating detected errors to a central device that is operable to communicate with each of the instances;
   determining at least one global error value at the central device;
   communicating the global error value to each of the instances of the software component;
   storing the global error value in the global error susceptibility register of each instance;
   comparing contents of the local error susceptibility register and the global error susceptibility register of each instance; and
   determining a fault tolerance value for the software component in each execution environment based on a difference between the respective local error susceptibility register and the respective global error susceptibility register.

8. The method of claim 7, further comprising outputting a warning if the contents of a local error susceptibility register and an associated global error susceptibility register differ significantly.

9. The method of claim 7, further comprising making updates to one of the execution environments, the fault-tolerance value being taken into consideration when the updates are being made.

10. The method of claim 7, further comprising deciding not to make changes to an execution environment when the fault-tolerance value indicates that that execution environment has a high error susceptibility in comparison with the error susceptibility of other instances of the software component in other execution environments.

11. The method of claim 7, wherein the at least one global error value comprises a global frequency of individual errors.

12. A system for fault-tolerance management of a software component, the system comprising:
   a plurality of data processing devices for executing a plurality of instances of the software component in different execution environments in which the respective instances interact with at least one different software component and/or different hardware, wherein each data processing device respectively comprises a first storage unit for storing a local error susceptibility value and a second storage unit for storing a global error susceptibility value;

a detection device for detecting an error of a first instance of the plurality of instances;

a central detection station comprising a buffer for temporarily storing the detected error of the first instance of the plurality of instances;

a communication interface for transmitting the detected error to the central detection station, an updating device for updating a local error susceptibility register of the first instance of the plurality of instances and a global error susceptibility register based on the detected error, the updating device configured to regularly update a respective global error susceptibility register of each instance of the plurality of instances with consideration of the temporarily stored error of the central detection station;

a fault-tolerance averaging device for determining a fault-tolerance value indicative of the stability of executing the software component in the respective execution environment based on the difference between the respective local error susceptibility register and the global error susceptibility register.

13. The system according to claim 12, wherein the central detection station communicates with the updating device to initiate the updating of the global error susceptibility register.

14. The system according to claim 13, further comprising a central global error susceptibility register at the central detection station.

15. The method according to claim 7, wherein executing the plurality of instances of the software component in different execution environments comprises executing the instances utilizing at least one different software component.

16. The method according to claim 7, wherein executing the plurality of instances of the software component in different execution environments comprises executing the instances utilizing different hardware.

* * * * *

UNITED STATES PATENT AND TRADEMARK OFFICE
CERTIFICATE OF CORRECTION

PATENT NO.       : 7,770,074 B2
APPLICATION NO.  : 12/123887
DATED            : August 3, 2010
INVENTOR(S)      : Kaefer et al.

It is certified that error appears in the above-identified patent and that said Letters Patent is hereby corrected as shown below:

On the Title Page, Item (75) Inventors, 2$^{nd}$ entry, delete "Koonig" and insert --Koenig--.

Signed and Sealed this

Sixteenth Day of November, 2010

David J. Kappos
*Director of the United States Patent and Trademark Office*